3,102,844
ORAL IRON-GLUCOSAMINE HEMATINIC COMPOSITION AND THERAPY
Leon Ellenbogen, New City, N.Y., assignor to American Cyanamid Company, New York, N.Y., a corporation of Maine
No Drawing. Filed Feb. 2, 1960, Ser. No. 6,118
3 Claims. (Cl. 167—68)

This invention relates to dietary and therapeutic compositions, and, more particularly, to new and useful compositions containing soluble iron. The present invention relates to the improved absorption of iron by the human body by the simultaneous administration of glucosamine or its salts. It has been found that the compositions of this invention produce a level of absorption of iron higher than that produced by iron or a composition of iron with other known adjuvants.

Iron is well-known in the field of nutrition as being an essential element and in the field of hematology for the treatment of conditions of iron deficiency. As is well-known, the blood levels and tissue content of iron in patients with iron deficiency conditions, have been found to be very low, thus indicating the necessity for supplemental iron therapy.

Iron preparations, when administered orally, must be given in very high doses to be effective because only a very small percentage of the oral dose is actually absorbed. When known oral iron preparations are administered in doses sufficiently high so that more iron is absorbed, they tend to cause various gastrointestinal disturbances, such as constipation and gastrointestinal irritation. By the practice of the present invention, such gastrointestinal disturbances are minimized since smaller amounts of iron are required when given with glucosamine to get the same absorption obtained with the use of larger amounts of iron without glucosamine.

The present invention is based upon the discovery that glucosamine enhances the absorption of soluble iron when concurrently administered. The increased soluble iron absorption provides a more consistent, more rapid and more uniform absorption of iron so as to replace the tissue iron stores more rapidly thus having a more rapid therapeutic effect and reducing the amount of time that the patient is required to take the oral iron therapy. Normally, without the glucosamine, it is known that it takes many months of oral iron therapy to reconstitute tissue iron stores.

The increased iron absorption provided by the novel compositions of this invention is evidenced by an increase in the total body radioactivity, and in the radioactivity of the liver, spleen and blood, when compositions containing radioactive $Fe^{59}$ material and a glucosamine compound are administered orally. The same result is obtained when these materials are separately administered within a reasonable length of time, for example, within about one hour or so.

The novel compositions of the present invention may be prepared with any absorbable iron compound and glucosamine or a glucosamine salt. The absorbable iron may be utilized in any of its various forms, for example, ferrous sulfate, ferrous gluconate, ferric chloride, ferric ammonium sulfate and soluble ferric pyrophosphate. The glucosamine may be utilized in any of its various forms viz. glucosamine itself or a glucosamine salt. A variety of glucosamine salts may be used. These are formed from the base and a non-toxic acid, either organic or inorganic, for example, phosphoric, sulfuric, hydrochloric, hydrobromic, citric, tartaric, succinic, and so forth.

In the therapeutically available iron preparations of the present invention the daily dose of iron as, for example, ferrous sulfate, may be from about 20 to about 600 milligrams. However, a daily dose of from about 50 to about 150 milligrams of soluble iron is satisfactory when given with glucosamine. The amounts of glucosamine employed with the above amounts of iron to increase the iron absorption may be from about 0.5 to 300 grams per daily dose. Ordinarily, however, from 25 to 75 grams of glucosamine per daily dose gives a maximum effect. The higher the concentration of glucosamine the better the absorption. In general, the glucosamine should be employed in a ratio of at least 10 milligrams per milligram of soluble iron material to obtain significant enhancement of soluble iron absorption. Higher amounts of glucosamine, and iron, of course, will produce greater enhancement of soluble iron absorption. Of course, species of animals and individuals within the various species may vary to some extent in their dose response to the compositions and process of the present invention. The weight of the subject and the degree of iron deficiency usually determine the dosage. However, in general, there is a definite and valuable response to these compositions and process.

The present invention thus provides a means for promoting the enhanced absorption of soluble iron materials. With such better absorption, it is possible to employ smaller amounts of soluble iron than those which are presently used, the physiological effects are more prompt, more uniform and more certainly predictable. This latter effect makes it possible to avoid undesirable side effects in many patients who, heretofore, were given excessive dosages of iron.

Solid compositions of therapeutic iron materials and glucosamine or its salts may be readily prepared in the form of tablets employing excipients such as certain types of clay, starch, tapioca, etc. Also, in place of tablets the mixture may be encapsulated in hard or soft gelatin capsules. Various other pharmaceutically inert carriers or diluents both liquid and solid may also be employed in the preparation of the tablets and capsules. Other medicaments compatible with the iron and glucosamine may be incorporated if desired, such as for example, the B-complex vitamins, such as vitamins $B_1$, $B_2$, $B_6$ and $B_{12}$, and other vitamins such as vitamins A, D, etc.

The following example will serve to illustrate the novel compositions and process of the present invention.

EXAMPLE I

Weanling rats (35–45 grams body weight) were fed orally by stomach intubation $Fe^{59}$ as ferrous sulfate for 5 consecutive days either alone (control animal) or together with glucosamine. Forty-eight hours after the last oral dose, the absorbed radioactivity was determined by placing the whole rat in a large plastic well scintillator. After determination of total body radioactivity, the rats were sacrificed and the radioactivity of the liver, spleen and blood were similarly determined. The results obtained are tabulated in Table I below:

*Table I*

| Experiment No. | Rat No. | Daily dosage | Today body radioactivity, μg. of Fe⁵⁹ | Radioactivity of— | | Radioactivity of blood, μg. Fe⁵⁹/ml. |
|---|---|---|---|---|---|---|
| | | | | Liver | Spleen | |
| | | | | μg. Fe⁵⁹/gm. | | |
| I | 1 | 100 μg. Fe⁵⁹ as FeSO₄ | 129 | 6.2 | 5.6 | 20.8 |
| | 2 | 100 μg. Fe⁵⁹ as FeSO₄+62.5 mg. glucosamine | 219 | 13.2 | 10.8 | 26.2 |
| II | 3 | 100 μg. Fe⁵⁹ as FeSO₄ | 103 | 3.7 | 2.7 | 21.0 |
| | 4 | 100 μg. Fe⁵⁹ as FeSO₄+30 mg. glucosamine | 139 | 5.3 | 4.6 | 24.0 |
| III | 5 | 100 μg. Fe⁵⁹ as FeSO₄ | 122 | 4.1 | 3.8 | 16.7 |
| | 6 | 100 μg. Fe⁵⁹ as FeSO₄+125 mg. glucosamine | 257 | 9.3 | 8.2 | 38.9 |
| IV | 7 | 25 μg. Fe⁵⁹ as FeSO₄ | 51 | 1.9 | 3.1 | 10.2 |
| | 8 | 25 μg. Fe⁵⁹ as FeSO₄+30 mg. glucosamine | 58 | 2.1 | 2.6 | 10.8 |
| V | 9 | 100 μg. Fe⁵⁹ as FeSO₄ | 193 | 10.1 | 10.8 | 8.1 |
| | 10 | 100 μg. Fe⁵⁹ as FeSO₄+125 mg. glucosamine | 261 | 13.3 | 17.3 | 11.7 |
| VI | 11 | 100 μg. Fe⁵⁹ as FeSO₄ | 51 | 2.8 | 3.0 | 1.5 |
| | 12 | 100 μg. Fe⁵⁹ as FeSO₄+125 mg. glucosamine | 122 | 9.5 | 7.6 | 3.9 |
| VII | 13 | 200 μg. Fe⁵⁹ as FeSO₄ | 274 | 17.1 | 23.4 | 39.0 |
| | 14 | 200 μg. Fe⁵⁹ as FeSO₄+30 mg. glucosamine | 353 | 25.5 | 27.5 | 58.6 |
| | 15 | 200 μg. Fe⁵⁹ as FeSO₄+15 mg. glucosamine | 302 | 24.7 | 20.8 | 66.2 |
| | 16 | 200 μg. Fe⁵⁹ as FeSO₄+5 mg. glucosamine | 313 | 25.7 | 16.6 | 55.8 |
| VIII | 17 | 100 μg. Fe⁵⁹ as FeSO₄ | 201 | 11.9 | 15.8 | 23.2 |
| | 18 | 100 μg. Fe⁵⁹ as FeSO₄+30 mg. glucosamine | 264 | 15.9 | 15.3 | 26.4 |
| | 19 | 100 μg. Fe⁵⁹ as FeSO₄+15 mg. glucosamine | 230 | 22.4 | 17.9 | 28.9 |
| | 20 | 100 μg. Fe⁵⁹ as FeSO₄+5 mg. glucosamine | 235 | 12.8 | 22.1 | 25.7 |

These results show conclusively that the absorption of soluble iron is greatly enhanced by the simultaneous administration of glucosamine.

What is claimed is:

1. A composition for oral administration which comprises a soluble iron material and at least one compound selected from the group consisting of glucosamine and a glucosamine salt, said compound providing enhanced absorption of iron and being present in a ratio of at least 10 milligrams per milligram of soluble iron material.

2. A composition for oral administration which comprises a soluble iron material and at least one compound selected from the group consisting of glucosamine and a glucosamine salt, said compound providing enhanced absorption of iron and being present in a ratio of from about 10 milligrams to about 2000 milligrams per milligram of soluble iron material.

3. A method for administering soluble iron which method comprises orally administering to a host a soluble iron material concurrently with a compound selected from the group consisting of glucosamine and a glucosamine salt, said compound providing enhanced absorption of iron and being present in a ratio of from about 10 milligrams to about 2000 milligrams per milligram of soluble iron material.

References Cited in the file of this patent

UNITED STATES PATENTS 1,888,186    Stoll et al. _____ Nov. 15, 1932

OTHER REFERENCES

U.S. Dispensatory, 23rd ed., 1943, p. 455.
Professional Informational Bulletin, "Cosa-Tetracyn," Chas. Pfizer and Co., Inc., Brooklyn, N.Y., 21-page booklet, pp. 3–4 relied upon.